(12) United States Patent
Liu et al.

(10) Patent No.: US 7,614,831 B2
(45) Date of Patent: Nov. 10, 2009

(54) MACHINING TOOLS HAVING CONCAVE CUTTING SURFACES FOR PRECISION MACHINING AND METHODS OF MANUFACTURING SUCH

(75) Inventors: Xinbing Liu, Acton, MA (US); Jon Ethington, Beverly, MA (US)

(73) Assignee: Panasonic Corporation, Osaka (JP)

( * ) Notice: Subject to any disclaimer, the term of this patent is extended or adjusted under 35 U.S.C. 154(b) by 36 days.

(21) Appl. No.: 11/374,582

(22) Filed: Mar. 13, 2006

(65) Prior Publication Data

US 2007/0212177 A1    Sep. 13, 2007

(51) Int. Cl.
    B23B 27/00    (2006.01)
(52) U.S. Cl. ........................ 407/113; 407/120
(58) Field of Classification Search ............... 407/62, 407/65, 113, 117
    See application file for complete search history.

(56) References Cited

U.S. PATENT DOCUMENTS

| | | | |
|---|---|---|---|
| 938,434 A * | 10/1909 | Pierpont | 407/57 |
| 5,022,797 A * | 6/1991 | Sawa et al. | 407/119 |
| 5,819,826 A * | 10/1998 | Schmatjen | 144/241 |
| 7,140,408 B1 * | 11/2006 | Hinchliff et al. | 144/241 |
| 2003/0035231 A1 | 2/2003 | Epstein et al. | |
| 2003/0223830 A1 * | 12/2003 | Bryan et al. | 407/119 |
| 2007/0039433 A1 * | 2/2007 | Bryan et al. | 82/13 |
| 2007/0221019 A1 * | 9/2007 | Ethington et al. | 82/117 |

FOREIGN PATENT DOCUMENTS

JP    59201702 A  *  11/1984

* cited by examiner

Primary Examiner—Boyer D Ashley
Assistant Examiner—Sara Addisu
(74) Attorney, Agent, or Firm—RatnerPrestia

(57) ABSTRACT

A machining tool with a cutting surface adapted to provide a variable projected machining width during machining, including the cutting surface and a back surface. The cutting surface includes a first cutting edge and a second cutting edge that extend to a tip of the machining tool and a cross section normal to a centerline of the machining tool that is concave between the first cutting edge and the second cutting edge. The back surface forms a first acute angle with the cutting surface at the first cutting edge and a second acute angle with the cutting surface at the second cutting edge, such that the cross section of the back surface normal to the centerline of the machining tool is convex between the first cutting edge and the second cutting edge.

16 Claims, 13 Drawing Sheets

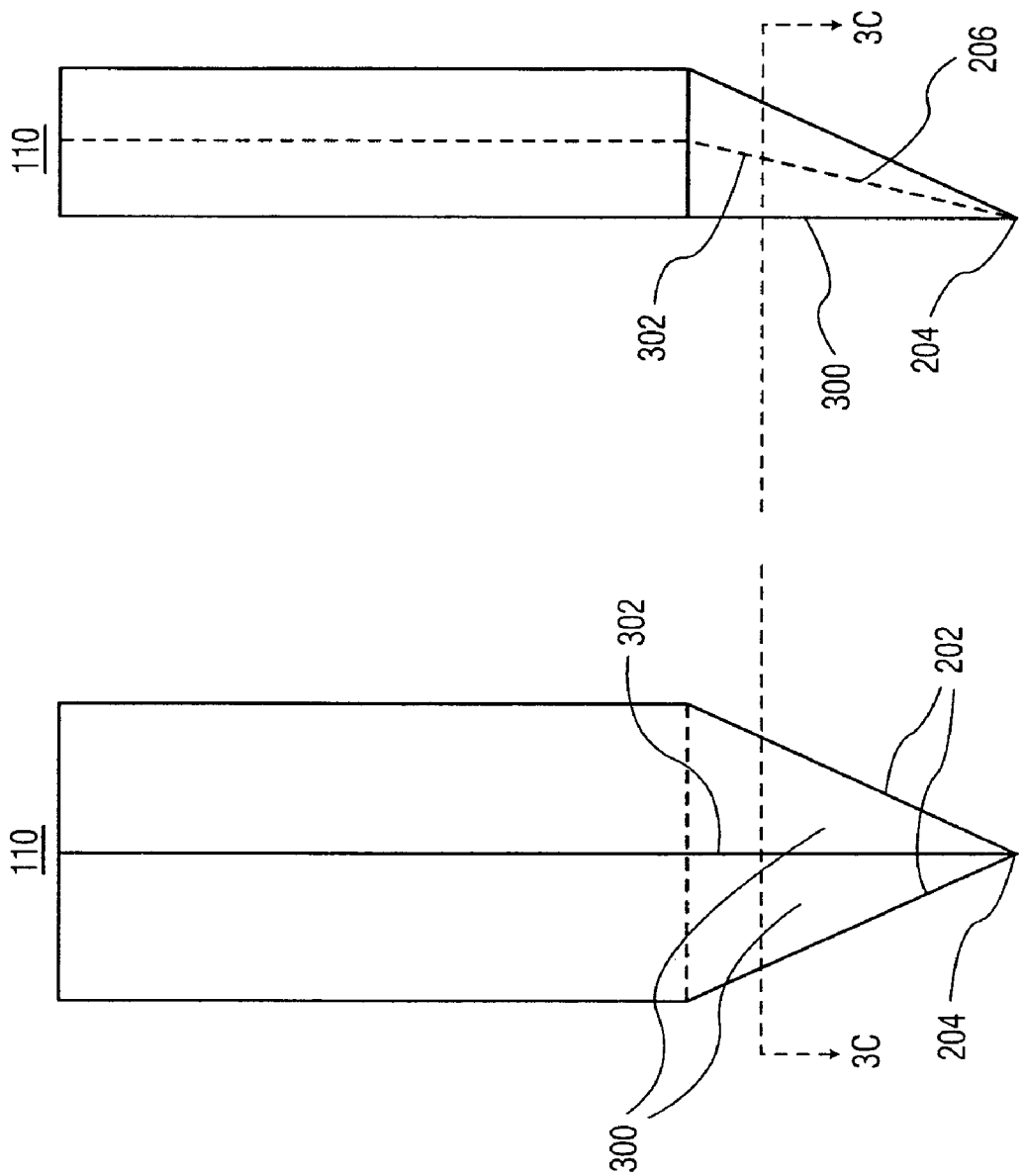

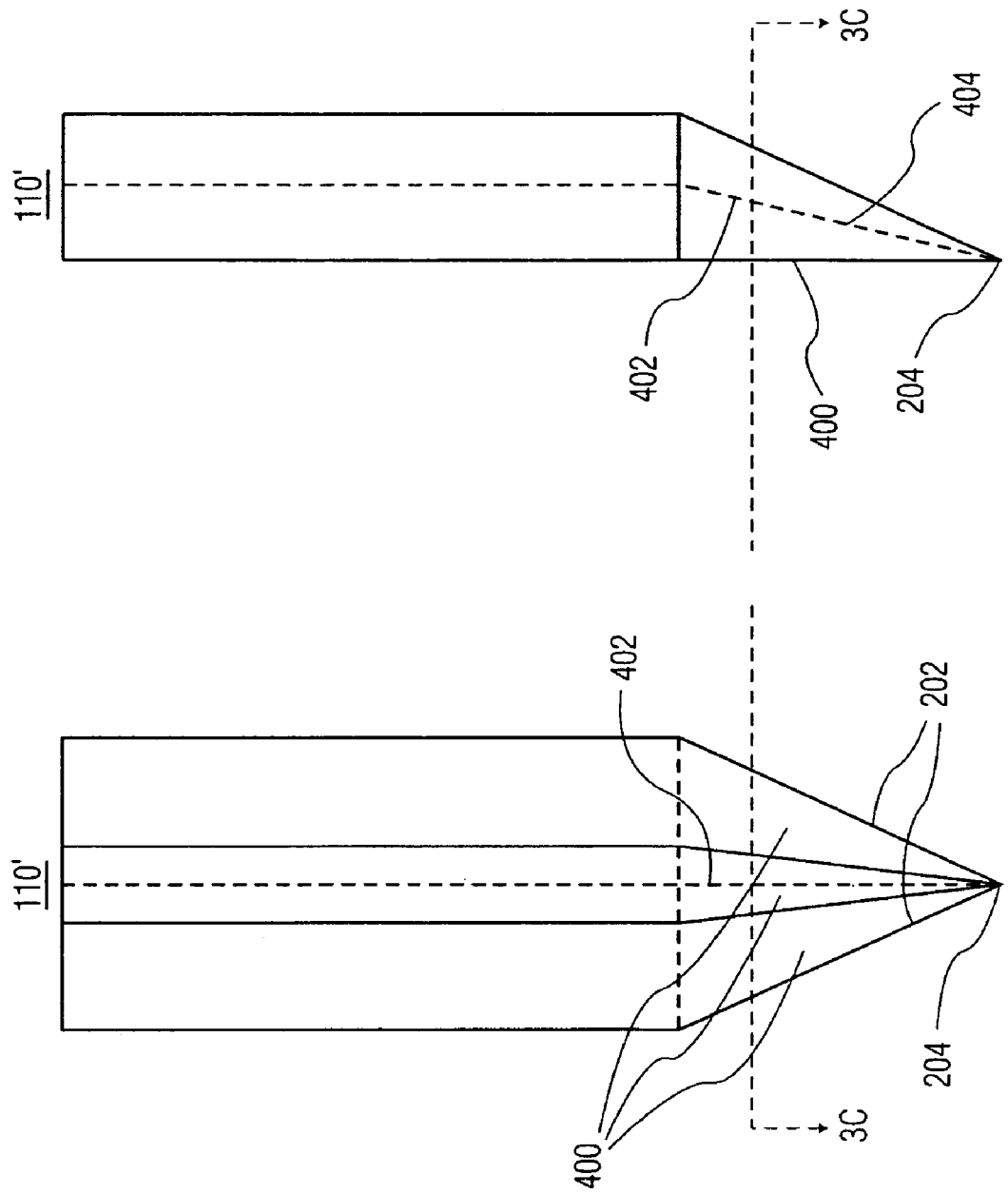

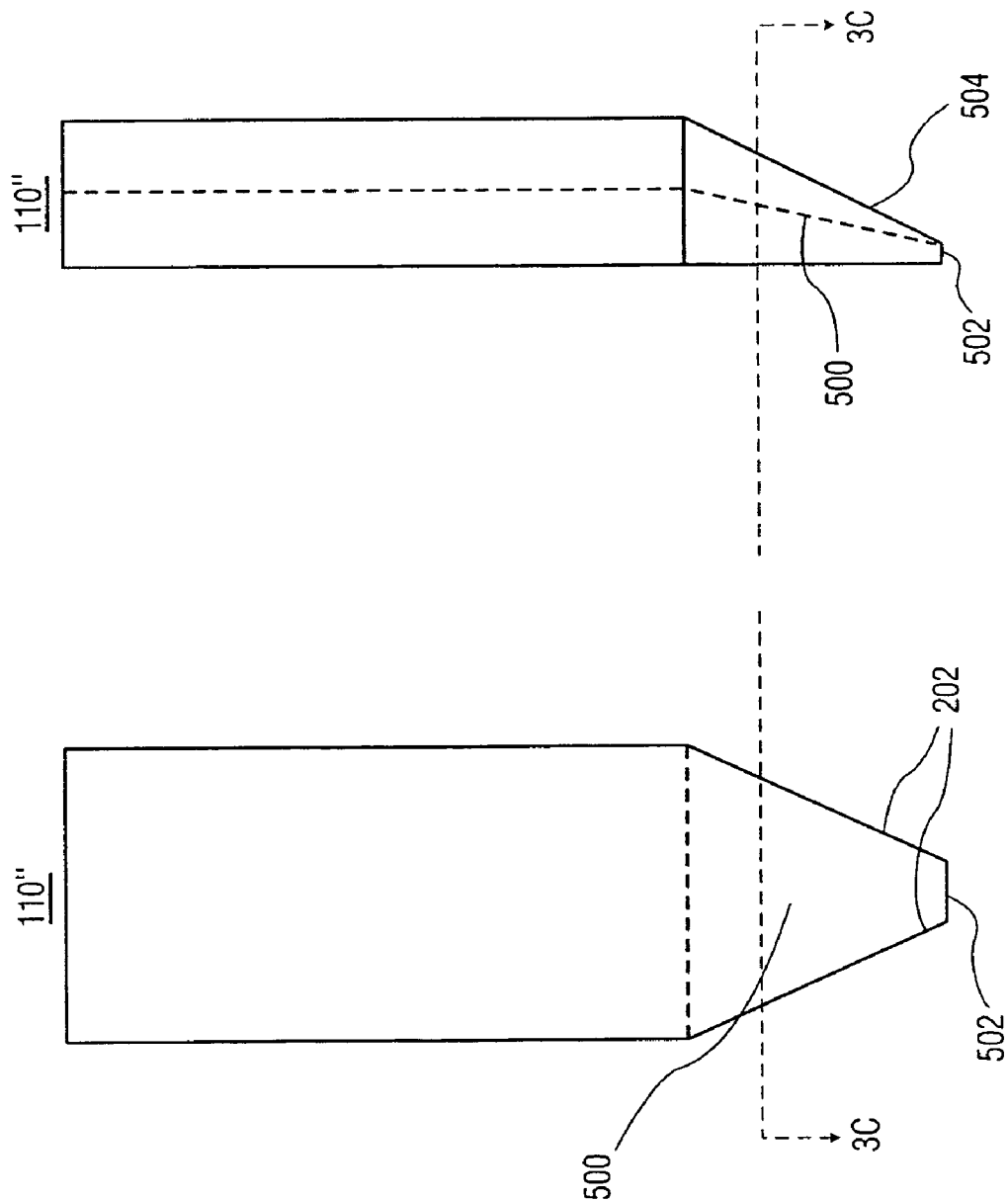

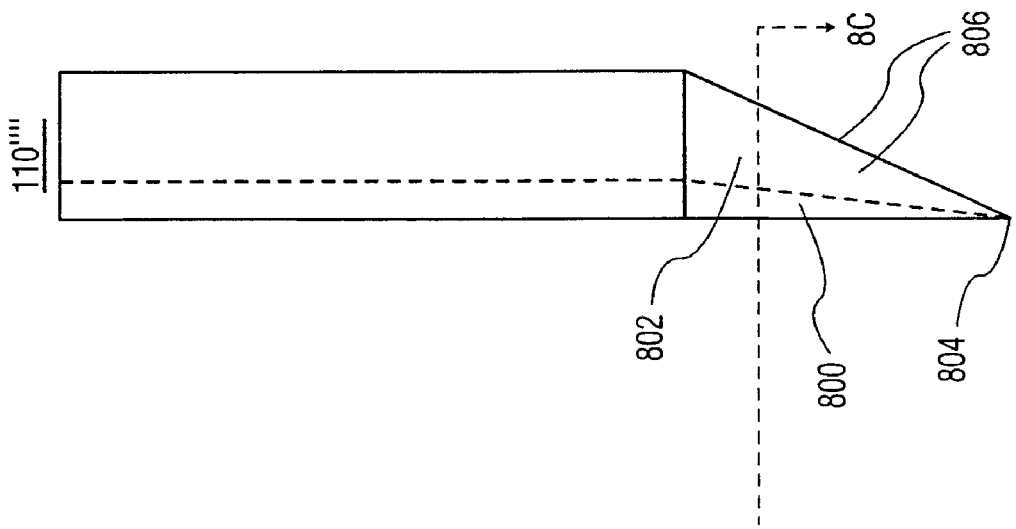
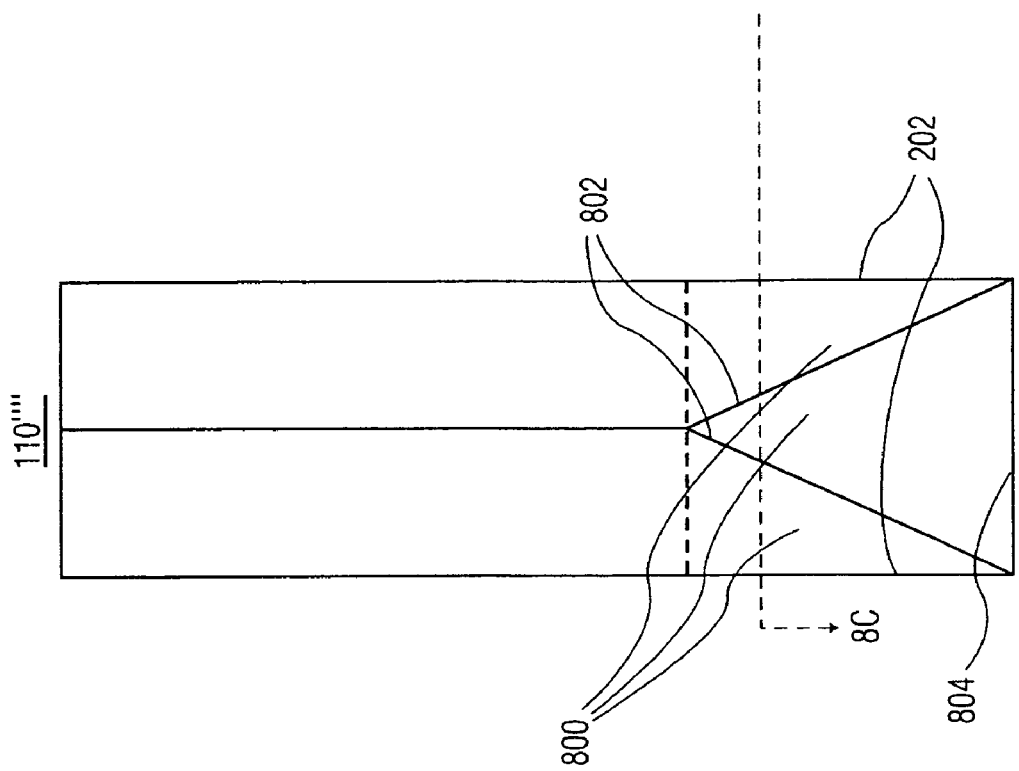

ial pickups.
MACHINING TOOLS HAVING CONCAVE CUTTING SURFACES FOR PRECISION MACHINING AND METHODS OF MANUFACTURING SUCH

FIELD OF THE INVENTION

The present invention concerns machining tools having concave cutting surfaces and methods of manufacturing these machining tools. In particular, these machining tools may by used in precision machining processes to produce microstructures having reduced feature sizes and improve surface profiles.

BACKGROUND OF THE INVENTION

Diamond machining offers high accuracy and surface finish, and is suitable for fabricating optical-grade molds for making optical components, such as lenses and gratings. For example, diamond tools may be used to machine Ni molds for making gratings used in optical pickup devices. Diamond turning, fly-cutting, and vibration assisted machining (VAM) are three precision diamond machining methods that have been tried. However, each has limitations that cannot satisfy some imagined device geometry configurations for the optical pickups.

Two other diamond machining methods, slow tool servo (STS) and fast tool servo (FTS) have also been advanced as alternative precision machining methods for producing a number of these imagined device geometry configurations.

The STS technique expands the capability of a traditional diamond turning machine. It enables the creation of surface structures such as micro-prisms, torics, off-axis aspheres, and freeform optics in general. STS uses only the translation and/or rotation stages of an ultra-precision diamond turning machine to carry out all machining motion of the machining tool. Given these diamond turning machines contain powerful motion controllers, tool-path processing can be done by the machine itself. However, the available bandwidth of Z-motion (motion normal to the substrate surface) is determined by the limitations of the motion stages of diamond turning machine. Thus, the bandwidth for STS is often less than 10 Hz for the linear feed axes. Still freeform optics or diffractive patterns can be generalized and/or characterized by a function which determines machine tool position.

In FTS, a piezoelectric transduction actuator, linear motor, or voice coil actuator, drives a diamond tool in a single axis motion at high frequency. The range of motion can be 10's of microns to nearly 1 millimeter. Some systems provide 100 um of travel while maintaining 1 kHz bandwidth. The advantage of FTS is the increased bandwidth this add-on tool provides, over the traditional diamond turning machine axes. Several examples of FTS systems are available, including systems developed by the Precision Engineering Center (PEC) at the North Carolina State University and Precitech Inc.

The FTS system also expands the capability of a traditional diamond turning machine, enabling the creation of surface structures such as micro-prisms, torics, off-axis aspheres, and freeform surfaces in general. For example, using the Precitech system, the tool path software uses a C-program or bitmap image to describe the desired part topography. An external general purpose computer with a digital signal processor uses high resolution angular feedback on the work spindle and the linear position feedback of the machine translational slide to accomplish "real-time" calculations of the axial position of the tool. Both the Precitech and PEC FTS systems are designed to produce very high dynamic movement during the turning process with low mechanical noise.

A system utilizing the full capabilities of a four axis diamond turning machine, in conjunction STS or FTS may have additional capabilities that other traditional diamond turning and fly-cutting method do not allow. For example reduced tool lead-in and lead-out zones (transition zones) may be realized. Additionally, there is the potential of machining curved grooves in the work pieces using STS or FTS. These capabilities are desirable for making many types of optical components, including lenses and gratings, as well as molds for optical components that may be used in optical pickups.

Using FTS, if the linear speeds of the tool relative to the surface are similar to those used in VAM, the surface finish and cut quality may be maintained at levels comparable to those achieved using VAM. However, using either STS or FTS allows for machining with unique orientations between tool and workpiece that are not achievable with VAM, which may provides an FTS with the ability to satisfy device geometry requirements that may not be achieved with a VAM system. Tests done by the inventors have shown that optical performance of gratings may be maintained at linear speed rates of only 35 mm/min in electroless nickel.

A desired characteristic of some optical pickup designs is a minimum transition zone. It may possible to realize this with sharp tool lead-out by the coordination of diamond turning machine axes using STS or FTS. By using a full positioning diamond turning machine with either STS or FTS, the feed—controlled by the machine—may be slowed down to decrease linear surface speed. Given a fixed bandwidth and retraction time, this will effectively reduce the lead-out transition zone. Optical properties in the transition zones of these exemplary optical pickup designs may not be overly stringent. Therefore, the degradation of surface finish that may result from slowing the feed may be acceptable.

These exemplary machining methods utilize machining tools that have substantially planar cutting surfaces. To cleanly cut the substrate material without tearing the material, such a machining tool is desirably aligned so that a cross section of the cutting surface in the plane of the substrate surface is perpendicular to the machining path being followed by the machining tool. Thus, the shape and size of the groove machined by the machining tool is set by the machining tool.

The present invention involves machining tools with concave cutting surfaces. Use of these exemplary machining tools may extend the capabilities of a precision machining system by allowing for additional control of the shape of the groove machined by the precision machining system during each pass of the machining tool.

SUMMARY OF THE INVENTION

An exemplary embodiment of the present invention is a machining tool with a cutting surface adapted to provide a variable projected machining width during machining, including the cutting surface and a back surface. The cutting surface includes a first cutting edge and a second cutting edge that extend to a tip of the machining tool and a cross section normal to a centerline of the machining tool that is concave between the first cutting edge and the second cutting edge. The back surface forms a first acute angle with the cutting surface at the first cutting edge and a second acute angle with the cutting surface at the second cutting edge, such that the cross section of the back surface normal to the centerline of the machining tool is convex between the first cutting edge and the second cutting edge.

Another exemplary embodiment of the present invention is a method of manufacturing a machining tool having a concave cutting surface adapted to project a variable machining width during use. A machining tool blank formed of tool material and having a substantially planar cutting surface and a convex back surface is provided. The substantially planar cutting surface and the convex back surface of the machining tool blank meet at: i) a first cutting edge to form a first edge angle; and ii) a second cutting edge to form a second edge angle. The first cutting edge and the second cutting edge extend to a tip of the machining tool blank. The substantially planar cutting surface of the machining tool blank is machined to remove a portion of the tool material of the machining tool blank from the substantially planar cutting surface and form the concave cutting surface of the machining tool. This machining reduces at least one of the first edge angle or the second edge angle.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Note that the shaded regions in FIGS. 2C, 3C, 3D, 4C, 4D, 5C, 5D, 7C, 7D, 8C, and 8D represent the cut surface of the tool material in these cut-away drawings. Included in the drawing are the following figures:

FIG. 3A is a front plan drawing illustrating an exemplary machining tool with a concave cutting surface according to the present invention.

FIG. 3B is a side plan drawing illustrating the exemplary machining tool of FIG. 3A.

FIG. 4A is a front plan drawing illustrating another exemplary machining tool with a concave cutting surface according to the present invention.

FIG. 4B is a side plan drawing illustrating the exemplary machining tool of FIG. 4A.

FIG. 5A is a front plan drawing illustrating a further exemplary machining tool with a concave cutting surface according to the present invention.

FIG. 5B is a side plan drawing illustrating the exemplary machining tool of FIG. 5A.

FIG. 8A is a front plan drawing illustrating yet another exemplary machining tool with a concave cutting surface according to the present invention.

FIG. 8B is a side plan drawing illustrating the exemplary machining tool of FIG. 5A.

DETAILED DESCRIPTION OF THE INVENTION

Exemplary embodiments of the present invention involve exemplary machining tools with concave cutting surfaces and exemplary methods of manufacture these machining tools. These exemplary machining tools may be used in a number of different precision machining systems and methods and may be rotated about their longitudinal axis; while the macroscopic tool feed direction is maintained so that a "projected" machining tool geometry may be realized.

Such exemplary precision machining methods may be desirable to use for optical grating creation. Because these exemplary methods utilize features of STS or FTS, the reduced lead-in and lead-out advantages of coordinated motion systems may be realized. Additionally, using "projected" views of an exemplary pre-shaped machining tool according to the present invention may allow for greater precision in the shaping of fine features. A US patent application, entitled "PRECISION MACHINING SYSTEM AND METHODS" and filed concurrently with the present invention, describes several precision machining systems and methods that may utilize exemplary machining tools of the present invention. It is noted that, although the exemplary machining tools of the present invention may most often be diamond machining tools, other machining tool materials, such as sapphire, silicon-carbide, tungsten, or tungsten-carbide, may be used as well.

Because the machining tool is fixed in the plane of the workpiece surface in both the STS and FTS methods, it may be rotated relative to the tool feed direction. This allows for use of a "projected" tool geometry, and thus a change in machined pitch or angle, resulting in a different cutting profile, may be realized. This feature of these exemplary methods may be particularly desirable for producing Fresnel lenses and other diffractive optics or mold therefor, although the manufacture of many other microstructures may be accomplished using these methods. It is noted that the exemplary machining tools of the present invention may be used with other machining methods as well.

Figure 1:
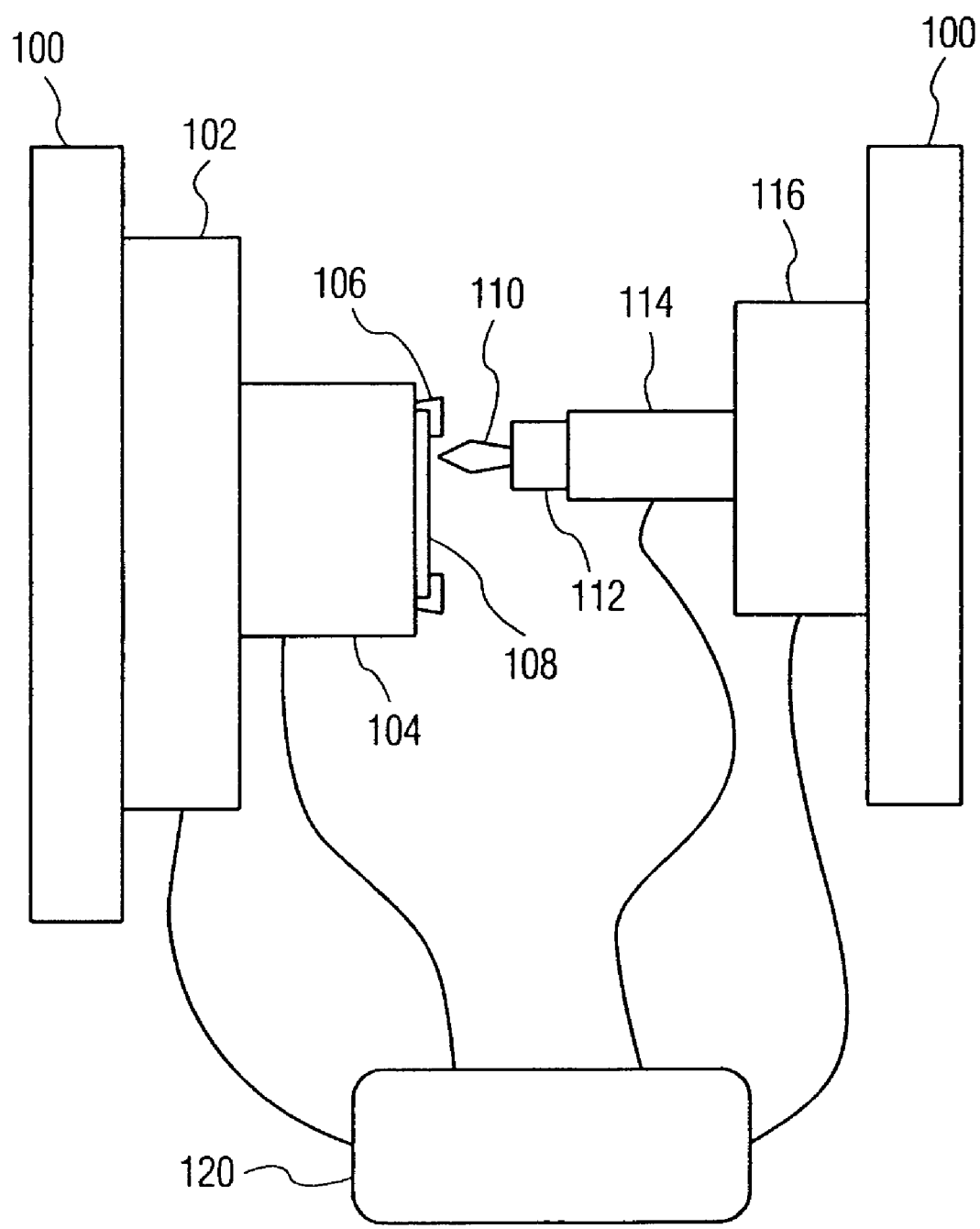
FIG. 1 is a side plan drawing illustrating an exemplary precision machining system that may be used with exemplary concave cutting surface machining tools according to the present invention.

FIG. 1 illustrates an exemplary precision machining system according to the present invention. This exemplary precision machining system is designed so that the cutting surface, also known as the rake face, of machining tool 110 may be rotated so that a variable machining width may be projected perpendicular to a machining path on the surface of workpiece 108.

Figure 3C:
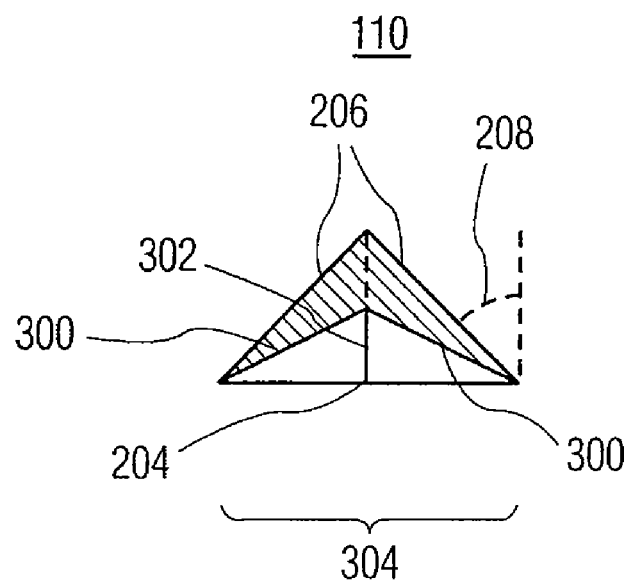
FIG. 3C is cut-away top plan drawing, cut along line 3C-3C in FIGS. 3A and 3B, illustrating the exemplary machining tool of FIGS. 3A and 3B.
Figure 3D:
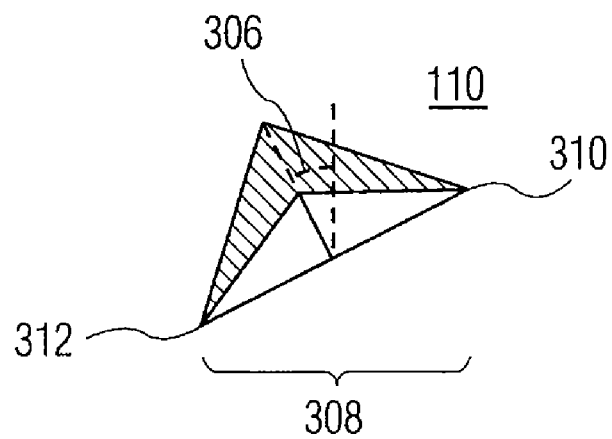
FIG. 3D is cut-away top plan drawing, cut along line 3C-3C in FIGS. 3A and 3B, illustrating the effect of rotating the exemplary machining tool of FIGS. 3A and 3B from the orientation shown FIG. 3C.

The exemplary precision machining system of FIG. 1 includes: base 100; translation stage 102 to move workpiece 108 along at least one axis parallel to its surface; workpiece spindle 104 to rotate the workpiece about an axis parallel to the Z axis; workpiece holder 106 to hold workpiece 108 during machining; Z translation stage 116 to control the relative Z position of the tip of machining tool 110 and the surface of workpiece 108; tool spindle 114; machining tool holder 112 to hold machining tool 110 such that the centerline of the machining tool is substantially parallel to the Z axis; and machining path controller 120 to control motion of the system such that the tip of machining tool 110 traverses a predetermine machining path on the surface of workpiece 108. Tool spindle 114 is coupled to machining tool holder 112 to rotate machining tool 110 about its longitudinal centerline. As illustrated in FIGS. 3C and 3D (as well as FIGS. 4C and 4D, FIGS. 5C and 5D, FIGS. 7C and 7D, and FIGS. 8C and 8D), rotating exemplary machining tool 110 in this manner may vary the width of its cutting surface projected normal to the machining path.

Exemplary methods of machining a surface of a workpiece using the exemplary system of FIG. 1 may use exemplary machining tool of the present invention. It is noted that, although the exemplary system of FIG. 1 is particularly suited to use in this exemplary method, other precision machining systems may be used in this exemplary method by appropriate programming of the system controllers to coordinate movement of the translation and/or rotational stages of these systems.

In one exemplary method, the workpiece is mounted in the precision machining system. The tip of exemplary machining tool 110 is aligned over the desired starting location on the surface of workpiece 108. This desired starting location may be at a specific plunge location at which machining tool 110 is to be plunged into the surface of workpiece 108 or, more desirably, the starting location may be along an acceleration path on which the tip of machining tool 110 enters the surface of workpiece 108 to the desired machining depth and the machining tool is accelerated relative to the surface of the workpiece in the plane of the surface of the workpiece. The cutting surface of machining tool 110 is substantially perpendicular to the surface of the workpiece. Machining tool 110 may then be rotated about the axis of its centerline, which is substantially normal to the surface of workpiece 108, until the width of the cutting surface of machining tool 110 projected normal to the machining path on the surface of workpiece 108 is the desired machining width.

The tip of machining tool 110 may then be plunged to a predetermined machining depth into the surface of workpiece 108, by moving the workpiece and/or machining tool 110 in a direction substantially normal to the surface of workpiece 108. As described above the tip of machining tool 110 may be plunged directly into the surface of workpiece 108 or, more desirably, the tip of the machining tool 110 may cut into the surface of workpiece 108 as the workpiece is moved relative to the machining tool in a plane parallel to the surface of the workpiece. This latter method causes less wear on the material of machining tool 110; however, it is the cause of the tool lead-in transition zone.

The workpiece and/or the machining tool are then moved in the plane substantially parallel to the surface of workpiece 108. This motion is coordinated so that the tip of machining tool 110 traverses the machining path on the surface of the workpiece. These coordinated movements may involve motion in two linear directions, in one linear direction and one rotational direction, or in two linear directions and one rotational direction.

Figures 2A, 2B, 2C:
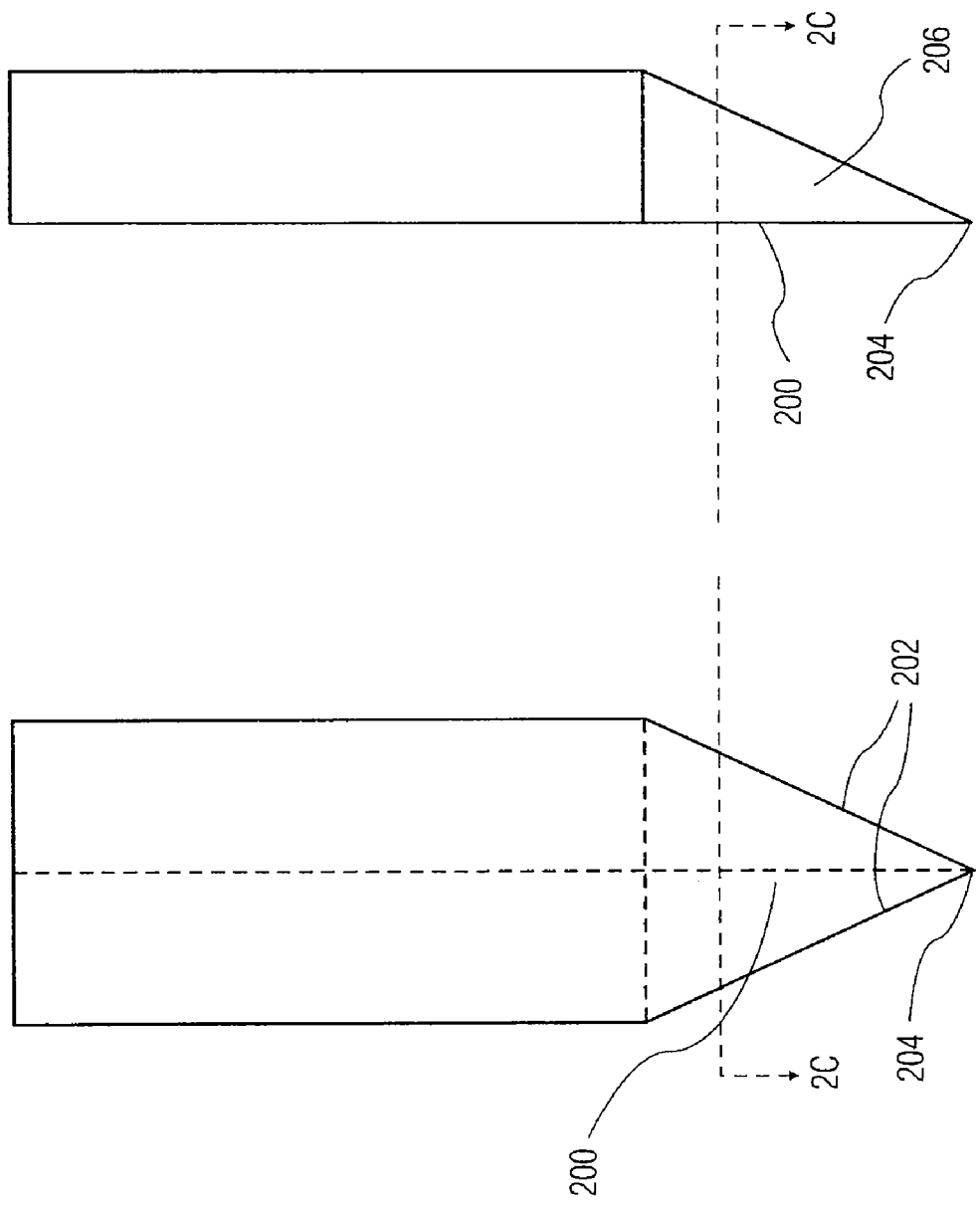
FIG. 2A is a front plan drawing illustrating a prior art machining tool.
FIG. 2B is a side plan drawing illustrating the prior art machining tool of FIG. 2A.
FIG. 2C is cut-away top plan drawing, cut along line 2C-2C in FIGS. 2A and 2B, illustrating the prior art machining tool of FIGS. 2A and 2B.

FIGS. 2A-C illustrate features of a prior art machining tool. FIG. 2A is a front view of the prior art machining tool, FIG. 2B is a side view of the prior art machining tool, and FIG. 2C is a top cut-away view of the prior art machining tool.

Cutting surface 200 of this prior art machining tool has two cutting edges 202, which meet at tip 204 of the machining tool. As may be seen in FIG. 2C, cutting surface 200 has a flat cross section as viewed normal to the centerline of the machining tool.

As shown in FIGS. 2B and 2C, another element of this prior art machining tool is back surface 208. This surface also extends between cutting edges 202 and has a convex cross section as seen from above. In this example, the back surface is formed of two planar sections. Back surface 208 forms clearance angle 210 with cutting surface at each cutting edge. If this angle is too small, then back surface 208 may come in contact with the edge of the material being cut near one of cutting edges 202, which may lead to a degradation in machining quality.

As noted above, in some applications, it may be desirable for the machining tool to be rotated such that the width of the cutting surface projected perpendicular to the machining path is reduced to a desired machining width less than the actual width of the cutting surface. To realize machining in this configuration, however, the machining tool desirably presents a sharp edge that is at an angle of $\leq 90°$ from the direction of the feed at each edge of the cutting surface, the cutting edges. Otherwise, the cutting edge may tear the material of the workpiece rather than cutting it, which may lead to an undesirably rough machined surface.

If the machining tool has a flat cutting surface, as in the prior art machining tool of FIGS. 2A-C, when this machining tool is used in an orientation with cutting surface 200 perpendicular to the machining path, then the cutting surface at both cutting edges 202 is at an angle of 90° from the direction of the feed. However, if the machining tool is rotated such that cutting surface 200 is not perpendicular to the machining path, then the cutting surface at one cutting edge is turned forward and is at an angle of <90° from the direction of the feed, an acute angle, but the cutting surface at the other cutting edge is turned backward and is at an angle of >90° from the direction of the feed. Therefore, the cutting surface proximate to the backward cutting edge of this prior art machining tool must be modified if the cutting surface at both cutting edges is to be at a desirable angle when the machining tool is rotated. The top-view of a machining tool with such a modified cutting surface has a concave cross section, such as the exemplary machining tools illustrated in FIGS. 3A-D, 4A-D, 5A-D, 7A-D, and 8A-D.

FIGS. 3A-D illustrate features of an exemplary machining tool 110 according to the present invention. FIG. 3A is a front view of exemplary machining tool 110, FIG. 3B is a side view of exemplary machining tool 110, and FIG. 3C is a top cut-away view of exemplary machining tool 110. FIG. 3D illustrates how the projected width of concave cutting surface 300 varies from a maximum, perpendicular, projected width 304 to reduced projected width 308 when machining tool 110 is rotated about its centerline by angle 306. The maximum width 304 of the cutting surface 300, measured in a plane normal to the centerline 302 of the machining tool 110 may be in a range from 1 nm to 1 mm.

Cutting surface 300 of exemplary machining tool 110 has two cutting edges 202, which meet at tip 204 of the machining tool. As may be seen in FIG. 3C, cutting surface 300 has a concave cross section as viewed normal to the centerline of machining tool 110. In this exemplary embodiment, this concave cross section is a V shape with apex 302 and includes two substantially planar sections extending from the two cutting edges 202. It is noted that, although the cutting surface cross section shown in FIGS. 3C and 3D is symmetrical, symmetry is not necessary. Concave cutting surface 300 (or 400 as shown in FIGS. 4C and 4D) may be asymmetrical, so that apex 302 (or 402) is not in the center of the cutting surface.

As shown in FIGS. 3B and 3C, another element of exemplary machining tool 110 that may become problematic is back surface 206. This surface also extends between cutting edges 202, forming acute angles 310 and 312 at the cutting edges, but has a convex cross section as seen from above. In this exemplary embodiment, this convex cross section is a V shape and includes two substantially planar sections extending from the two cutting edges 202. An important consideration that is related to back surface 206 is clearance angle 208. If this angle is too small, then back surface 206 may extend beyond a cutting edge 202 when machining tool 110 is rotated, thus leading to a wider projected width than desired, as well as a likely degradation in machining quality.

Thus, the maximum angle to which an exemplary machining tool according to the present invention may be desirably rotated during machining may be determined either by the shape of the cutting surface or by the shape of the back surface. FIGS. 4A-4D, FIGS. 5A-D, FIGS. 7A-D, and FIGS. 8A-D illustrate exemplary machining tools 110' and 110", respectively, for which the maximum desirable rotation angles are based on the shape of their back surfaces and are approximately equal to their clearance angles 208.

Figure 4C:
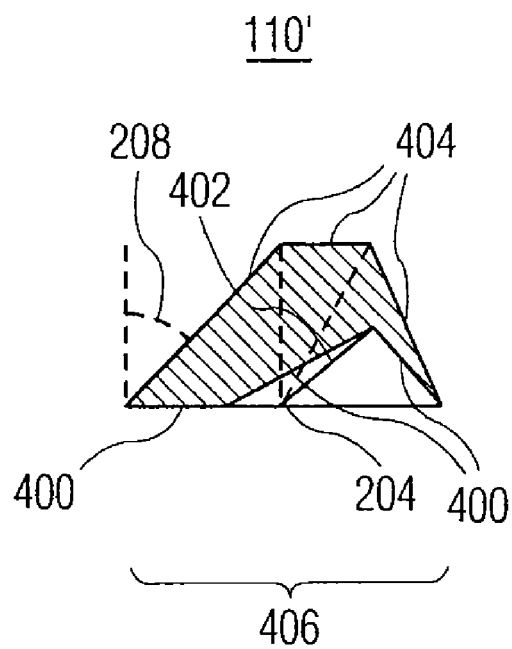
FIG. 4C is cut-away top plan drawing, cut along line 4C-4C in FIGS. 4A and 4B, illustrating the exemplary machining tool of FIGS. 4A and 4B.
Figure 4D:
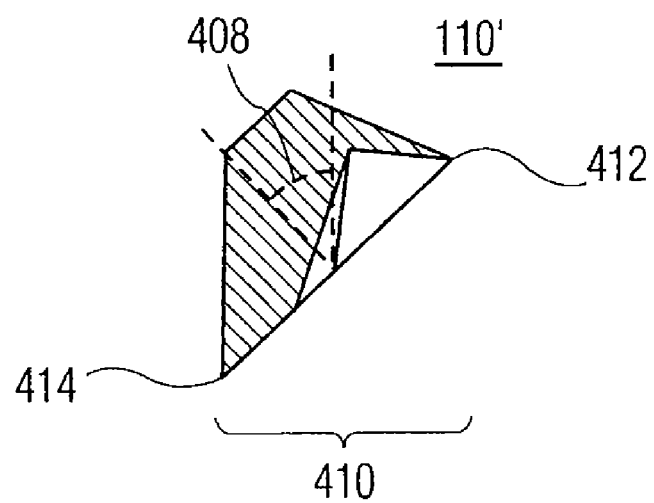
FIG. 4D is cut-away top plan drawing, cut along line 4C-4C in FIGS. 4A and 4B, illustrating the effect of rotating the exemplary machining tool of FIGS. 4A and 4B from the orientation shown FIG. 4C.

FIGS. 4A-D illustrate features of another exemplary machining tool 110" according to the present invention. FIG. 4A is a front view of exemplary machining tool 110", FIG. 4B is a side view of exemplary machining tool 110", and FIG. 4C is a top cut-away view of exemplary machining tool 110". FIG. 4D illustrates how the projected width of concave cutting surface 400 varies from a maximum, perpendicular, projected width 406 to reduced projected width 410 when machining tool 110" is rotated about its centerline by angle 408.

As may be seen in FIG. 4C, cutting surface 400 has a concave cross section as viewed normal to the centerline of machining tool 110". In this exemplary embodiment, this concave cross section includes three substantially planar sections extending from the two cutting edges 202, two of which form an off-center, V-shaped divot in the front of the machining tool. This off-center divot is centered on apex 402 may allow an exemplary machining tool to have a greater maximum rotation angle, and, thus, a smaller minimum projected width, without making acute angles 412 and 414 formed at the cutting edges so sharp that the machining tool becomes structurally unsound.

As in the previous exemplary embodiment, back surface 404 forms an acute angle at the cutting edges, but has a convex cross section including three sections as seen from above. One skilled in the art will understand that exemplary back surface 404 shown in FIGS. 4A-D is merely one exemplary multifaceted back surface that may be used in the various embodiments of the present invention. Other back surfaces with different arrangements of sections, such as shown in FIGS. 8A-D, or more than three sections, may be used as well. Additionally, FIGS. 5A-D illustrate smoothly curved back surface 504, which meets smoothly curved cutting surface 500 at cutting edges 202 to form acute angles 512 and 514.

It is also noted that other multifaceted cutting surface cross sections are possible, such as a symmetric three section face with a truncated V-shape, as Shown in FIGS. 8A-D, or cross sectional shapes of cutting surfaces with four or more sections. FIGS. 5A-D illustrate another exemplary embodiment of the cutting surface of a machining tool according to the present invention, smoothly curved cutting surface 500.

Figure 5C:
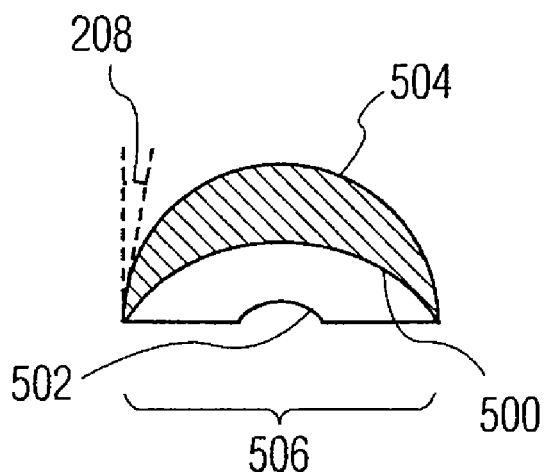
FIG. 5C is cut-away top plan drawing, cut along line 5C-5C in FIGS. 5A and 5B, illustrating the exemplary machining tool of FIGS. 5A and 5B.
Figure 5D:
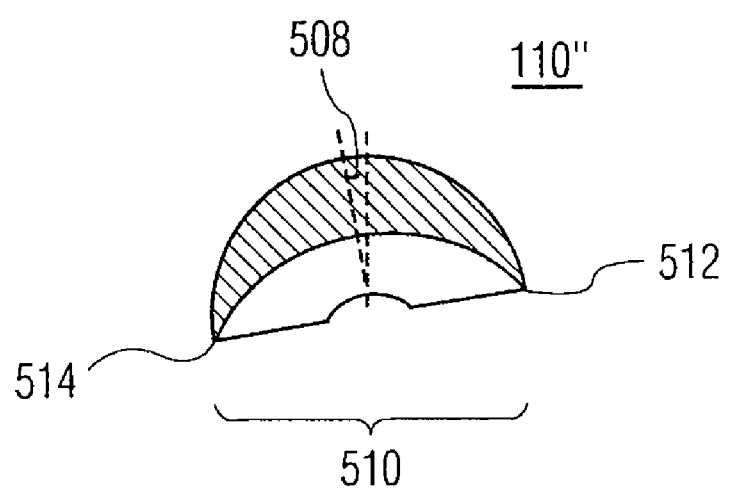
FIG. 5D is cut-away top plan drawing, cut along line 5C-5C in FIGS. 5A and 5B, illustrating the effect of rotating the exemplary machining tool of FIGS. 5A and 5B from the orientation shown FIG. 5C.

FIGS. 5A-D illustrate features of another exemplary machining tool 110" according to the present invention. FIG. 5A is a front view of exemplary machining tool 110", FIG. 5B is a side view of exemplary machining tool 110", and FIG. 5C is a top cut-away view of exemplary machining tool 110". FIG. 5D illustrates how the projected width of concave cutting surface 500 varies from a maximum, perpendicular, projected width 506 to reduced projected width 510 when machining tool 110" is rotated about its centerline by angle 508.

Exemplary machining tool 110" includes flat tool tip 502 with cutting edges 202 angling outward so that grooves machined using exemplary machining tool 110" have trapezoidal cross sections, rather than the isosceles triangular cross sections of grooves formed using exemplary machining tools 110 and 110' of FIGS. 3A-D and FIGS. 4A-D, respectively. Although flat tool tip 502 is shown as centered and perpendicular to the centerline of exemplary machining tool 110" in FIGS. 5A-D, it is noted that this configuration is merely exemplary and that other configurations in which flat tool tip 502 is offset to one side and/or set at a non-right angle to the centerline of a machining tool may be used in exemplary embodiments of the present invention as well.

It is also noted that, although smoothly curved cutting surface 500 is shown as circular and symmetrical about the center of the cutting surface in FIGS. 5C and 5D, it is contemplated that other smoothly curved cutting surfaces: such as parabolic; hyperbolic; and/or asymmetrically curved surfaces, may be used in exemplary embodiments of the present invention. Additionally, smoothly curved and substantially planar sections may be combined in an exemplary cutting surface. For example, the divot in cutting surface 400 could be a smoothly curved section rather than being V-shaped as shown in FIGS. 4A-D.

FIGS. 7A-D illustrate features of an additional exemplary machining tool 110''' according to the present invention. Tip 204 of exemplary machining tool 110''' is located off of the centerline of the machining tool such that one of the cutting edges is parallel to the edge of the machining tool. This location of tip 204 is merely exemplary and is not intended to be limiting. One skilled in the art will understand that intermediate positions of tip 204 between the exemplary embodiments of FIGS. 3A-D and FIGS. 7A-D may be used as well.

Figure 7B:
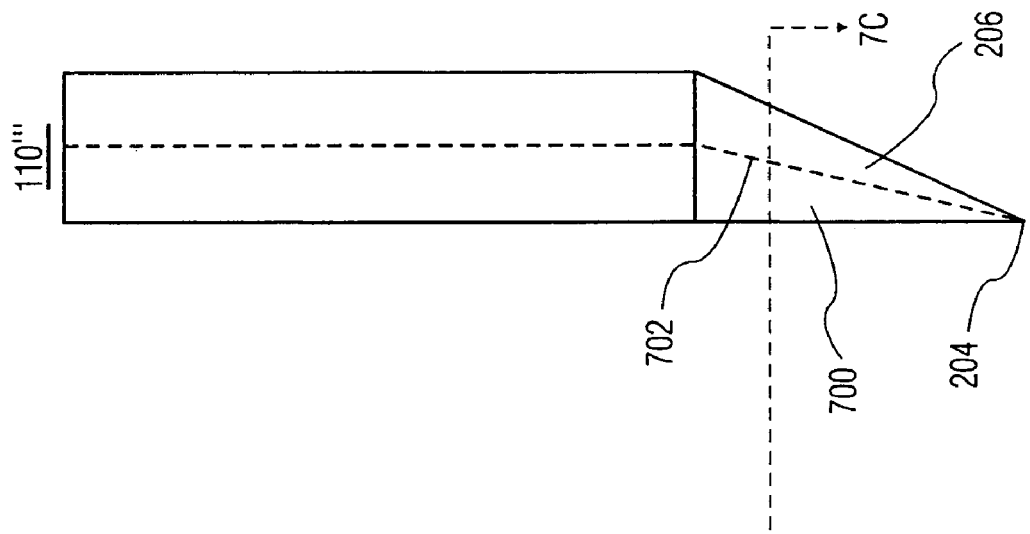
FIG. 7B is a side plan drawing illustrating the exemplary machining tool of FIG. 5A.
Figure 7A:
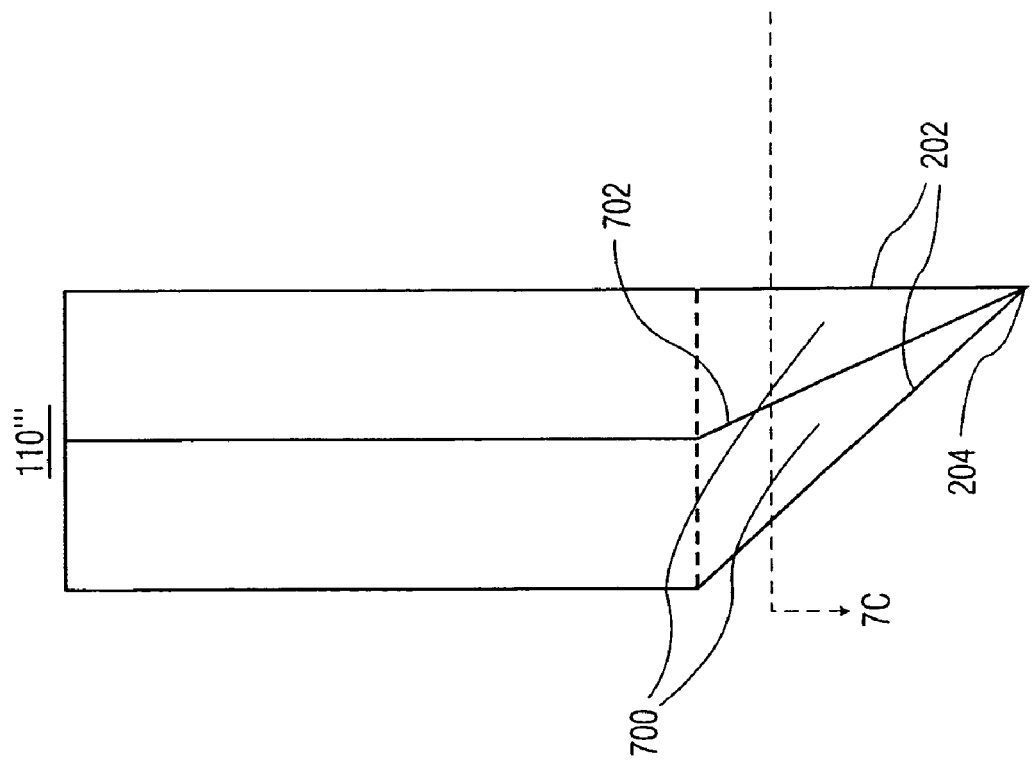
FIG. 7A is a front plan drawing illustrating an additional exemplary machining tool with a concave cutting surface according to the present invention.
Figure 7C:
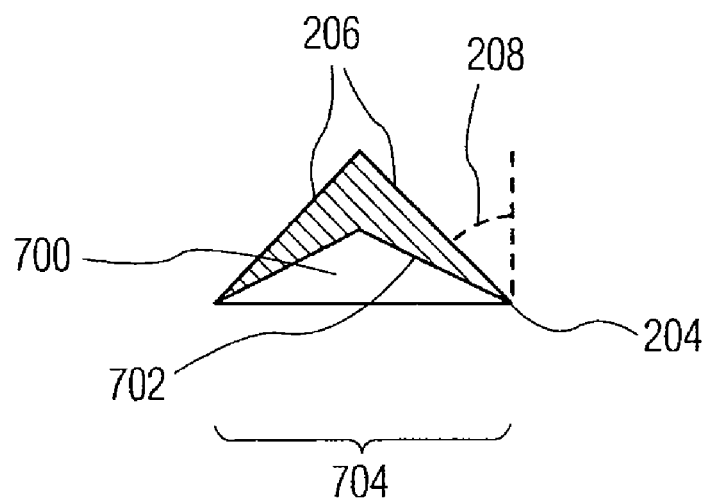
FIG. 7C is cut-away top plan drawing, cut along line 7C-7C in FIGS. 7A and 7B, illustrating the exemplary machining tool of FIGS. 7A and 7B.
Figure 7D:
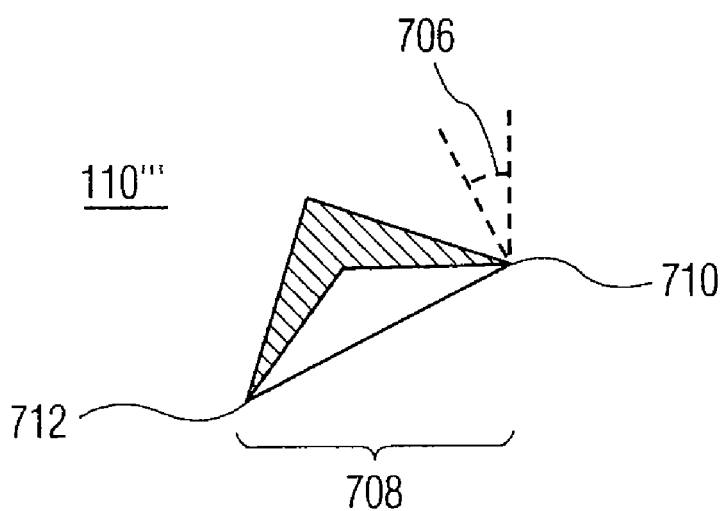
FIG. 7D is cut-away top plan drawing, cut along line 7C-7C in FIGS. 7A and 7B, illustrating the effect of rotating the exemplary machining tool of FIGS. 7A and 7B from the orientation shown FIG. 7C.

FIG. 7A is a front view of exemplary machining tool 110''', FIG. 7B is a side view of exemplary machining tool 110''', and FIG. 7C is a top cut-away view of exemplary machining tool 110'''. FIG. 7D illustrates acute angles 710 and 712 formed between cutting surface 700 and back surface 206 at cutting edges 202. FIG. 7D also illustrates how the projected width of concave cutting surface 700 varies from a maximum, perpendicular, projected width 704 to reduced projected width 708 when machining tool 110''' is rotated about its centerline by angle 706.

It is noted that, although cutting surface 700 of exemplary machining tool 110''' is shown to be formed of two planar sections, similar to cutting surface 300 of FIGS. 3A-D, other concave cutting surfaces possibly similar to cutting surface 400 of FIGS. 4A-D or cutting surface 500 of FIGS. 5A-D, may alternatively be used in exemplary embodiments of the present invention.

FIGS. 8A-D illustrate features of yet another exemplary machining tool 110'''' according to the present invention. Flat tip 804 of exemplary machining tool 110'''' extend across the maximum machining width of the machining tool such that cutting edges 101 are substantially parallel to the centerline of exemplary machining tool 110''''.

Figure 8C:
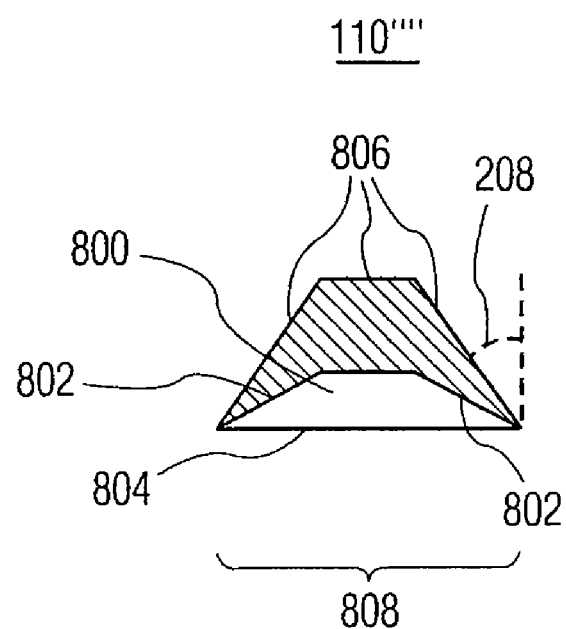
FIG. 8C is cut-away top plan drawing, cut along line 8C-8C in FIGS. 8A and 8B, illustrating the exemplary machining tool of FIGS. 8A and 8B.
Figure 8D:
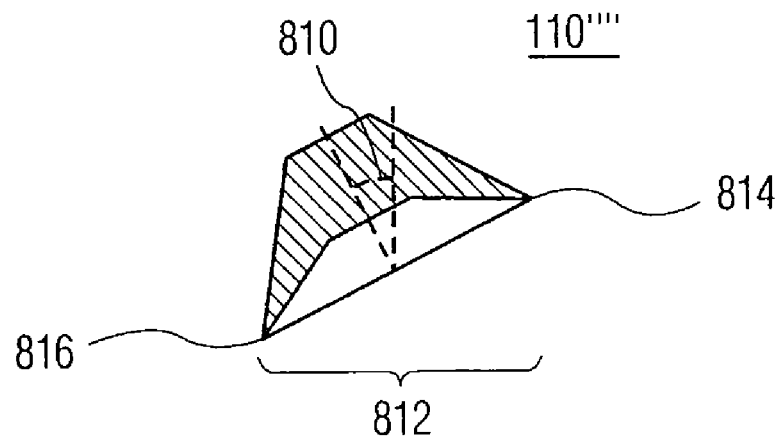
FIG. 8D is cut-away top plan drawing, cut along line 8C-8C in FIGS. 8A and 8B, illustrating the effect of rotating the exemplary machining tool of FIGS. 8A and 8B from the orientation shown FIG. 8C.

FIG. 8A is a front view of exemplary machining tool 110'''', FIG. 8B is a side view of exemplary machining tool 110'''', and FIG. 8C is a top cut-away view of exemplary machining tool 110''''. FIG. 8D illustrates how the projected width of concave cutting surface 800 varies from a maximum, perpendicular, projected width 808 to reduced projected width 812 when machining tool 110'''' is rotated about its centerline by angle 810.

Because exemplary cutting surface 800 of exemplary machining tool 110'''' includes three planar sections, these three planar sections meet at two apices 802. Back surface 806 also includes three sections. However, as illustrated in FIG. 8D, exemplary cutting surface 800 and back surface 806 meet in acute angles 814 and 816 along cutting edges 202.

It is noted that exemplary machining tool 110''' of FIGS. 7A-D may be used to form a variable pitch sawtooth pattern and exemplary machining tool 110'''' of FIGS. 8A-D may be used to form a variable pitch square wave pattern on the surface of a workpiece.

Figure 6:
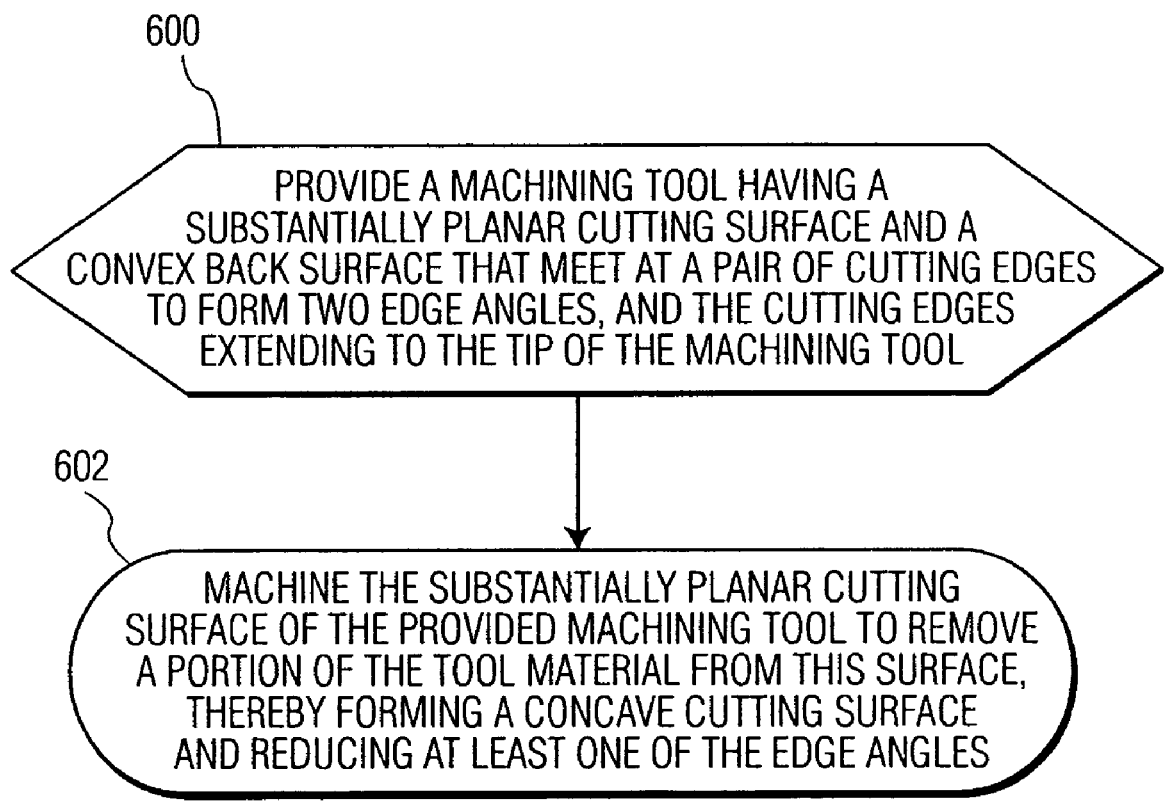
FIG. 6 is a flowchart illustrating an exemplary method of manufacturing exemplary machining tools with concave cutting surfaces according to the present invention.

FIG. 6 illustrates an exemplary method of manufacturing a machining tool having a concave cutting surface adapted to project a variable machining width during use. A machining tool blank having a substantially planar cutting surface and a convex back surface is provided, step 600. The substantially planar cutting surface and the convex back surface meet at: i) a first cutting edge to form a first edge angle; and ii) a second cutting edge to form a second edge angle. The two cutting edges extend to the tip of the machining tool blank. The machining tool blank is desirably selected to provide the desired projected shape, and maximum width, of the concave cutting surface of the exemplary machining tool being manufactured. Thus, the tip may be a pointed tip, if the machining tool to be manufactured has a pointed tip (e.g. exemplary machining tools 110, 110', and 110''' of FIGS. 3A-D, FIGS. 4A-D, and FIGS. 7A-D, respectively) or a flat tip (e.g. exemplary machining tools 110" and 110'''' of FIGS. 5A-D and FIGS. 8A-D, respectively). For example, the prior art machining tool of FIGS. 2A-C illustrates one potential machining tool blank that may be provided in this step. As discussed above the tool material of the machining tool blank may be any material used in precision machining system, such as diamond, sapphire, silicon-carbide, tungsten, or tungsten-carbide.

The substantially planar cutting surface of the machining tool blank is machined to remove a portion of the tool material of the machining tool blank from the substantially planar cutting surface, step 602. The first edge angle and/or the second edge angle are reduced by this machining process. This machining process desirably forms the concave cutting surface of the machining tool.

Due to the small size of the cutting surface, with feature sizes ranging from nanometers to 1 mm across, and the desire for the cutting surface cross section to be similar to the tip, this step of machining the substantially planar cutting surface of the machining tool blank requires the use of a relatively precise and accurate micro-machining technique. However, a number of such micro-machining techniques exist, including reactive ion etching, plasma etching, laser ablation, focused ion beam machining, and three dimensional photolithography.

The present invention includes a number of exemplary machining tools with concave cutting surfaces and methods of manufacturing these machining tools. Although the invention is illustrated and described herein with reference to specific embodiments, it is not intended to be limited to the details shown. Rather, various modifications may be made in the details within the scope and range of equivalents of the claims and without departing from the invention. In particular, one skilled in the art may understand that many features of the various specifically illustrated embodiments may be mixed to form additional exemplary machining tools also embodied by the present invention.

What is claimed:

1. A machining tool with a cutting surface adapted to provide a variable projected machining width during machining, the machining tool comprising:

the cutting surface, which includes a first cutting edge and a second cutting edge positioned at an angle relative to each other and that extend to a tip of the machining tool; and a back surface that forms a first acute angle with the cutting surface at the first cutting edge and a second acute angle with the cutting surface at the second cutting edge;

wherein:

a cross section of the cutting surface of the machining tool normal to a centerline of the machining tool is concave between the first cutting edge and the second cutting edge; and a cross section of the back surface of the machining tool normal to the centerline of the machining tool is convex between the first cutting edge and the second cutting edge.

2. A machining tool according to claim 1, wherein the machining tool is one of a diamond machining tool, a sapphire machining tool, a silicon-carbide machining tool, a tungsten machining tool, or a tungsten-carbide machining tool.

3. A machining tool according to claim 1, wherein the cutting surface includes:

a first substantially planar section extending from the first cutting edge; and a second substantially planar section extending from the second cutting edge.

4. A machining tool according to claim 3, wherein:

the first substantially planar section and the second substantially planar section meet at an apex in a center of the cutting surface; and the cross section of the cutting surface of the machining tool normal to the centerline of the machining tool has a V-shape.

5. A machining tool according to claim 3, wherein the first substantially planar section and the second substantially planar section meet at an apex that is displaced from a center of the cutting surface.

6. A machining tool according to claim 3, wherein the cutting surface further includes a third substantially planar section extending between the first substantially planar section and the second substantially planar section.

7. A machining tool according to claim 1, wherein the cutting surface includes a substantially smoothly curved concave surface section.

8. A machining tool according to claim 7, wherein the substantially smoothly curved concave surface section extends from the first cutting edge to the second cutting edge.

9. A machining tool according to claim 7, wherein the substantially smoothly curved concave surface of the cutting surface is symmetrical about a center of the cutting surface.

10. A machining tool according to claim 7, wherein the substantially smoothly curved concave surface of the cutting surface is asymmetrical about a center of the cutting surface.

11. A machining tool according to claim 7, wherein the cross section of the cutting surface is one of circular, parabolic, or hyperbolic.

12. A machining tool according to claim 7, wherein the cutting surface further includes a substantially planar section.

13. A machining tool according to claim 1, wherein the back surface includes:
- a first substantially planar section extending from the first cutting edge; and
- a second substantially planar section extending from the second cutting edge.

14. A machining tool according to claim 1, wherein the back surface is a substantially smoothly curved convex surface extending from the first cutting edge to the second cutting edge.

15. The machining tool according to claim 1, wherein a maximum width of the cutting surface measured from the first cutting edge to the second cutting edge in a plane normal to the centerline of the machining tool is between about 1 nm and 1 mm.

16. The machining tool according to claim 1, wherein the tip of the machining tool is one of a pointed tip or a flat tip.

* * * * *

UNITED STATES PATENT AND TRADEMARK OFFICE
CERTIFICATE OF CORRECTION

PATENT NO.       : 7,614,831 B2                                              Page 1 of 1
APPLICATION NO.  : 11/374582
DATED            : November 10, 2009
INVENTOR(S)      : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 69 days.

Signed and Sealed this

Nineteenth Day of October, 2010

David J. Kappos
*Director of the United States Patent and Trademark Office*